United States Patent
Shahid et al.

(10) Patent No.: US 9,940,642 B1
(45) Date of Patent: Apr. 10, 2018

(54) ELECTRONIC REAL ESTATE ACCESS SYSTEM

(71) Applicant: Shah Technologies LLC, Danville, CA (US)

(72) Inventors: Ayman Atef Shahid, Danville, CA (US); Shady Atef Shahid, Danville, CA (US)

(73) Assignee: SHAH TECHNOLOGIES LLC, Danville, CA (US)

( * ) Notice: Subject to any disclaimer, the term of this patent is extended or adjusted under 35 U.S.C. 154(b) by 272 days.

(21) Appl. No.: 14/658,071

(22) Filed: Mar. 13, 2015

Related U.S. Application Data (62) Division of application No. 13/691,658, filed on Nov. 30, 2012, now Pat. No. 9,128,471.

(51) Int. Cl.
| | |
|---|---|
| *G08B 21/00* | (2006.01) |
| *G06Q 30/02* | (2012.01) |
| *G06Q 50/16* | (2012.01) |
| *G07C 9/00* | (2006.01) |

(52) U.S. Cl.
CPC ..... *G06Q 30/0261* (2013.01); *G06Q 30/0267* (2013.01); *G06Q 50/16* (2013.01); *G07C 9/00182* (2013.01); *G07C 9/00571* (2013.01); *G07C 9/00896* (2013.01); *G07C 2009/00206* (2013.01); *G07C 2009/00936* (2013.01)

(58) Field of Classification Search
CPC ........... G07C 9/00571; G06Q 30/0261; G06Q 30/06; G06Q 50/16
USPC ....................................... 340/5.73
See application file for complete search history.

(56) References Cited

U.S. PATENT DOCUMENTS

| | | | |
|---|---|---|---|
| 4,808,993 | A | 2/1989 | Clark |
| 4,916,443 | A | 4/1990 | Barrett et al. |
| 5,397,884 | A | 3/1995 | Saliga |
| 5,654,696 | A | 8/1997 | Barrett et al. |
| 6,006,068 | A | 12/1999 | Elkin et al. |
| 6,072,402 | A | 6/2000 | Kniffin et al. |
| 6,472,973 | B1 | 10/2002 | Harold et al. |

(Continued)

OTHER PUBLICATIONS

Notice of Allowance received for U.S. Appl. No. 13/691,558, dated Aug. 10, 2015, 16 pages.

(Continued)

*Primary Examiner* — Mark Rushing
(74) *Attorney, Agent, or Firm* — Dentons US LLP (57) ABSTRACT

A system for providing physical access to a building that is for sale, lease, or rent is described. The system includes a server, a remote device located at the building that prohibits access to the building, and a handheld device. The handheld device transmits location information for the handheld device and identification information to the server. The server identifies the building based on the location information and transmits marketing information for the building to the handheld device. The device displays the marketing information and transmits a request for access to the building, the request transmitted to the server. The remote device is configured to provide access to the building when the remote device receives an access signal from the server or from the handheld device. The access signal is sent from the server based on confirmation of the location information for the handheld device and confirmation of the identification information.

19 Claims, 5 Drawing Sheets

(56) References Cited

U.S. PATENT DOCUMENTS

| | | |
|---|---|---|
| 6,624,742 B1 | 9/2003 | Romano et al. |
| 6,989,732 B2 | 1/2006 | Fisher |
| 7,009,489 B2 | 3/2006 | Fisher |
| 7,086,258 B2 | 8/2006 | Fisher et al. |
| 7,664,801 B2 | 2/2010 | Walker |
| 7,880,584 B2 | 2/2011 | Larson et al. |
| 8,058,971 B2 | 11/2011 | Harkins et al. |
| 8,196,708 B2 | 6/2012 | Kung |
| 8,254,542 B2 | 8/2012 | Frederick |
| D669,757 S | 10/2012 | Dent |
| 8,593,252 B2 | 11/2013 | Fisher |
| 8,608,575 B2 | 12/2013 | Waldock et al. |
| 8,635,462 B2 | 1/2014 | Ullmann |
| 8,677,116 B1 | 3/2014 | Bicer |
| 8,688,594 B2 | 4/2014 | Thomas et al. |
| 8,723,641 B2 | 5/2014 | Sadighi et al. |
| 8,797,138 B2 | 8/2014 | Myers et al. |
| 8,903,978 B2 | 12/2014 | Zerr et al. |
| 8,934,841 B2 | 1/2015 | Koh et al. |
| 2005/0035848 A1 | 2/2005 | Syed et al. |
| 2005/0273346 A1 | 12/2005 | Frost |
| 2006/0106628 A1 | 5/2006 | Faherty et al. |
| 2007/0226046 A1 | 9/2007 | Share |
| 2007/0260465 A1 | 11/2007 | Cook |
| 2008/0154774 A1 | 6/2008 | Dennison et al. |
| 2009/0030718 A1 | 1/2009 | Bengson |
| 2010/0176919 A1* | 7/2010 | Myers ............... G07C 9/00571 340/5.73 |
| 2011/0289106 A1 | 11/2011 | Rankin, Jr. et al. |
| 2012/0068817 A1 | 3/2012 | Fisher |
| 2012/0086549 A1 | 4/2012 | Barnes, Jr. |
| 2012/0126936 A1 | 5/2012 | Harkins et al. |

OTHER PUBLICATIONS

Notice of Allowance received for U.S. Appl. No. 13/691,658, dated Aug. 19, 2015, 16 pages.

Non-Final Office Action received for U.S. Appl. No. 13/691,658 dated Aug. 7, 2014, 22 pages.

Notice of Allowance received for U.S. Appl. No. 13/691,658, dated Feb. 3, 2015, 22 pages.

"RE/MAX Deploys Virtual Real Estate Agents", Expert System, vol. 19, No. 5, Nov. 2002, pp. 299-309.

Zeng et al., "Optimal Spatial Decision Making Using GIS: A Prototype of a Real Estate Geographical Information System (REGIS)", Int. J. Geographical Information Science, vol. 15, No. 4, 2001, pp. 307-321.

* cited by examiner

ELECTRONIC REAL ESTATE ACCESS SYSTEM

CROSS-REFERENCE TO RELATED APPLICATIONS

This application is a Divisional of U.S. patent application Ser. No. 13/691,658, filed Nov. 30, 2012, the content of which is hereby incorporated by reference in its entirety.

BACKGROUND

1. Field

The present disclosure relates to real estate access and, in one particular example, to a location-based real estate access system.

2. Related Art

Traditional real estate sales benefit from a real estate sales agent scheduling showings of a particular property for potential real estate purchasers. The real estate agent must be available at the particular property in order to provide the potential property purchasers access to the property, to provide tours of the property, and to answer questions about the property. This allows the potential purchasers to experience the property in order to determine whether the property meets the potential purchasers' styling, size, layout, and functional needs. When the potential purchaser is committed to purchasing a property, the potential purchaser typically seeks representation by a real estate professional.

By requiring that a real estate sales agent be available at a particular property before potential buyers may view the property, the number of potential property purchasers who are able to view the particular property is significantly reduced. This is especially true during days and times of the week when real estate agents are not available to provide access to property. The reduction in potential purchasers who view the property often results in the property staying on the market for an extended duration, the property selling for less than an optimal sales price, or discouraging the property owner from continuing to pursue a sale of the property. Further, the potential purchasers' inability to conveniently view property results in a significant reduction in the number of properties that the potential purchasers view. This results in the potential purchasers not considering a property for purchase that may otherwise fit their needs.

During open house showings, the number of available agents at a particular property may not be sufficient to address the number of potential purchasers viewing the property. As a result, not all potential purchasers who view the property are able to fully experience the property. For example, potential purchasers who are not able to meet with an agent during an open house will be limited in the information that they can collect about the property and may be limited in accessing certain parts of the property.

One existing option for allowing a potential property purchaser to access a property without requiring a real estate sales agent to be present at the property is to provide a mechanical lockbox at the property location. The lockbox contains the key to the property and the key is accessible only by using an alphabetical or numerical passcode. A real estate sales agent provides potential purchasers with the passcode so that they can access the key to the property. However, disclosing the passcode to potential purchasers brings about additional or unintended liabilities. For example, the potential purchasers can disseminate the passcode to individuals who are unknown to the real estate sales agent and who can then access the property without accountability.

Because the successful sale or purchase of a real estate property often depends on the ability of purchasers to quickly and conveniently experience a property they are considering for purchase, existing systems fail to provide comprehensive techniques for providing real estate access.

SUMMARY

A system for providing physical access to a building that is for sale, lease, or rent is described. The system includes a server, a remote device located at the building that prohibits access to the building, and a handheld device. The handheld device transmits location information for the handheld device and identification information to the server. The server identifies the building based on the location information and transmits marketing information for the building to the handheld device. The handheld device displays the marketing information on a display and transmits a request for access to the building, the request transmitted to the server. The remote device is configured to provide access to the building when the remote device receives an access signal from the server or from the handheld device. The access signal is sent from the server after confirmation of the location information for the handheld device and confirmation of the identification information.

The user of the handheld device may provide user input indicating interest in the displayed marketing information. In response, the handheld device transmits a marketing request to the server. The marketing request requests additional characteristics about the building. In response to receiving the marketing request, the server transmits supplementary characteristics about the building to the handheld device for display.

The confirmation of the location information for the handheld device may comprise confirmation that the location information indicates the handheld device is within a threshold distance of the remote device. The confirmation of the location information may further comprise confirmation that the location information is received by the server within a determined time of the server receiving the request to provide access. The threshold distance is based in part on the precision of the location information. The location information comprises an absolute location that is determined based on GPS signal information. The access signal may be transmitted from the server to the handheld device. The handheld device then transmits the access signal to the remote device. When the remote device receives the access signal, the remote device provides access to the building.

BRIEF DESCRIPTION OF THE FIGURES

The present application can be best understood by reference to the following description taken in conjunction with the accompanying drawing figures, in which like parts may be referred to by like numerals.

DETAILED DESCRIPTION

The following description is presented to enable a person of ordinary skill in the art to make and use the various embodiments. Descriptions of specific devices, techniques, and applications are provided only as examples. Various modifications to the examples described herein will be readily apparent to those of ordinary skill in the art, and the general principles defined herein may be applied to other examples and applications without departing from the spirit and scope of the present technology. Thus, the disclosed technology is not intended to be limited to the examples described herein and shown, but is to be accorded the scope consistent with the claims.

Various embodiments are described below relating to building and real estate access. A system for providing physical access to a building that is for sale, lease, or rent is described. The system includes a server, a remote device located at the building that prohibits access to the building, and a handheld device. The handheld device transmits location information for the handheld device and identification information to the server. The server identifies the building based on the location information and transmits marketing information for the building to the handheld device. The handheld device displays the marketing information on a display and transmits a request for access to the building. The request is transmitted to the server by the handheld device. The remote device is configured to provide access to the building when the remote device receives an access signal from the server or from the handheld device. The access signal is sent from the server after confirmation of the location information for the handheld device and confirmation of the identification information.

The user of the handheld device may provide user input indicating interest in the displayed marketing information. In response, the handheld device transmits a marketing request to the server. The marketing request requests additional characteristics about the building. In response to receiving the marketing request, the server transmits supplementary characteristics about the building to the handheld device for display.

The confirmation of the location information for the handheld device may comprise confirmation that the location information indicates the handheld device is within a threshold distance of the remote device. The confirmation of the location information may further comprise confirmation that the location information is received by the server within a determined time of the server receiving the request to provide access. The threshold distance may be based in part on the precision of the location information. The location information may comprise an absolute location that is determined based on GPS signal information. The access signal may be transmitted from the server to the handheld device. The handheld device may then transmit the access signal to the remote device. When the remote device receives the access signal, the remote device provides access to the building.

This technique enables the use of a handheld device, such as a smartphone device, for integration with key access systems based on location. As a result, additional devices may not be necessary to permit access to a real estate property.

Figure 1:
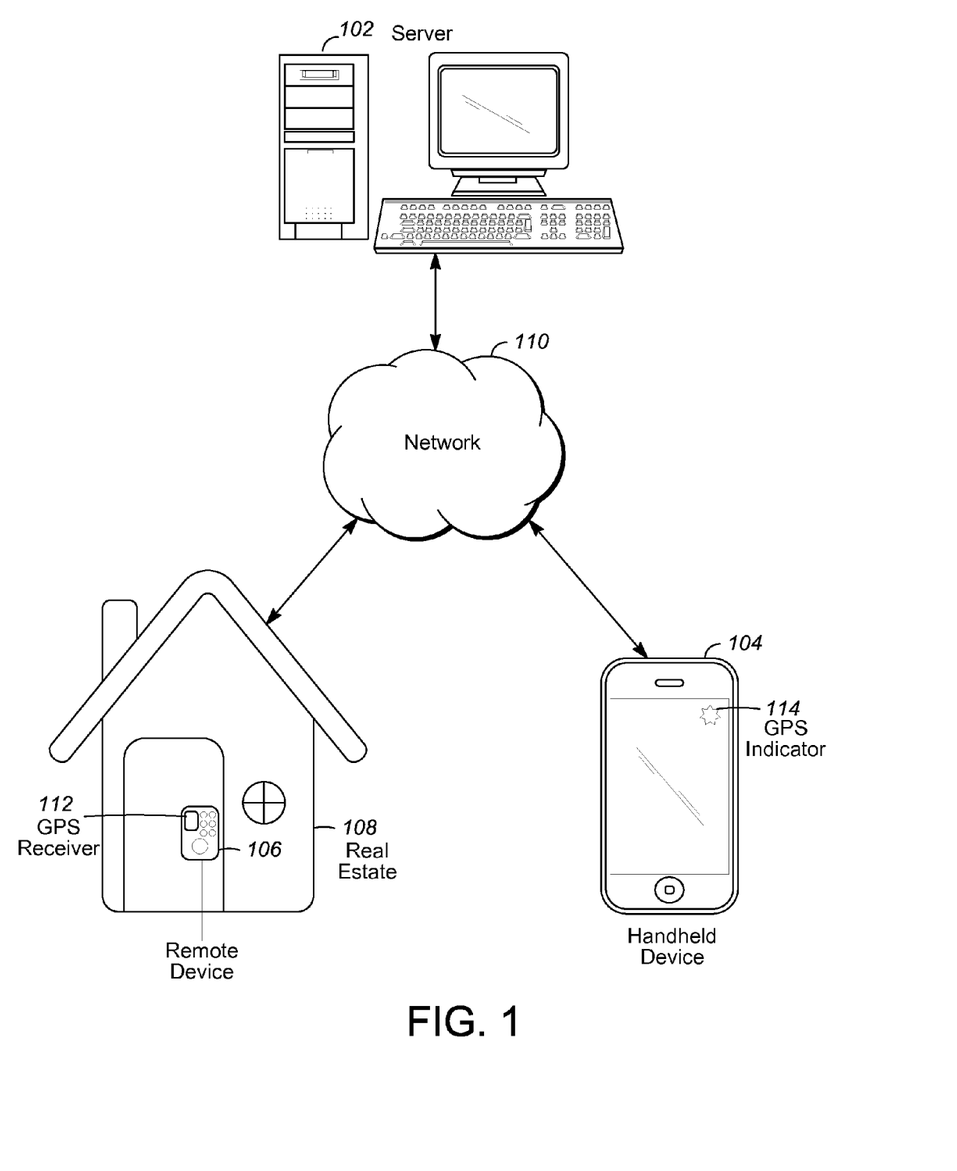
FIG. 1 illustrates an exemplary system for providing physical access to a real estate property or building.

FIG. 1 illustrates an exemplary system for providing access to a real estate property or building. The system is configured, for example, to provide physical access to a building 108. Alternatively, or in addition, the system may be configured to provide physical access to a parcel of land or any other real estate property. An individual may request access to the real estate in order to view it in anticipation of a potential purchase, lease, or rent. Accordingly, the real estate to which the system provides access may be for sale, lease, or rent.

Generally, any number of handheld devices 104 and remote devices 106 may be coupled to server 102 though network 108. Server 102 may include a web or information server for interfacing with network 108. Server 102 may utilize various Web data interface techniques such as Common Gateway Interface (CGI) protocol and associated applications (or "scripts"), Java® "servlets", i.e., Java applications running on a Web server, or the like to transmit and receive data from handheld device 104 and remote device 106. Server 102, although described herein in the singular, may actually comprise plural computers, devices, backends, and the like, communicating (wired and/or wireless) and cooperating to perform the functions described herein.

Server 102 may include any one of various types of computer devices, having, e.g., a processing unit, a memory (including a permanent storage device), and a communication interface, as well as other conventional computer components (e.g., input device, such as a keyboard and mouse, output device, such as display). Server 102 may communicate, in part or in whole, via wireless or hardwired communications, such as Ethernet, IEEE 802.11b wireless, or the like.

A remote device 106 is located at a real estate location. The remote device 106 may include a display, one or more processors, a communication module, a mechanism for providing access to the real estate, a battery, and a location sensor. The communication module may be, for example, a cellular module configured to access a GSM or CDMA-based network, a WLAN module configured to access an 802.11X network, a Bluetooth module configured to access other Bluetooth-enabled devices, a radio module configured to communicate using a proprietary protocol operating on a radio frequency, or the like. The cellular module may be configured to access, for example, an HSPA network, an HSPA+network, an LTE network, a WiMAX network, and other cellular wireless communication networks.

In one example, the remote device 106 is configured to access network 110 using the communication module. Remote device 106 and server 102 may communicate, e.g., via suitable communication interfaces via a network 108, such as the Internet.

In one example, the mechanism for providing access to the real estate is a secure drawer that opens, revealing a key to the real estate property. In another example, the mechanism for providing access is a deadbolt style locking mechanism. The locking mechanism includes a chassis with a throw deadbolt. For example, the throw deadbolt is a one-inch throw deadbolt that is retractable. When the deadbolt is retracted, the door to the real estate property may be opened and closed. When the deadbolt is extended, the door to the real estate property may not be opened. By retracting the deadbolt, the remote device provides access to the real estate property.

The location sensor is configured to sense a location of the remote device 106. In one example, the location sensor is a GPS receiver 112 that receives GPS signals in order to calculate a location. In another example, the location sensor is a WiFi or cellular network sensor that uses triangulation based on signals from multiple transmitters to determine a location. The location of the remote device 106 may be transmitted to the server using the communication module.

Handheld device 104 may include a laptop computer, a cellular phone, a PDA, a tablet, and the like. Handheld device 104 and server 102 communicate, e.g., via suitable communication interfaces via a network 108, such as the Internet. Similarly, handheld device 104 and remote device 106 may communicate, e.g., via network 108 or a different network, such as the Internet, or via a short distance communication protocol, such as Bluetooth. Alternatively, the handheld device 104 may be a wearable device, such as a device worn on the wrist or over the eyes, or may be an embedded device, such as a component of a vehicle.

Handheld device 104 may include a display, a location sensor, an RF transmitter, an RF receiver, one or more processors, and a computer-readable storage medium. Handheld device 104 is configured to connect to network 110 using the RF transmitter and RF receiver. For example, handheld device 104 may use a cellular module configured to access a GSM or CDMA-based network, a WLAN module configured to access an 802.11X network, a Bluetooth module configured to access other Bluetooth-enabled devices, a near field communications mobile configured to access other devices, or the like.

The location sensor of handheld device 104 is configured to sense a location of the handheld device 104. In one example, the location sensor is a GPS receiver that receives GPS signals in order to calculate a location. For example, a GPS indicator 114 may be displayed on the handheld device 104 when a GPS signal is being received by the handheld device 104 or when the GPS component of the handheld device 104 is active. In another example, the location sensor is a WiFi or cellular network sensor that uses triangulation based on signals from multiple transmitters to determine a location. The location of the handheld device 104 may be transmitted to the server using the RF receiver and RF transmitter.

Figure 2:
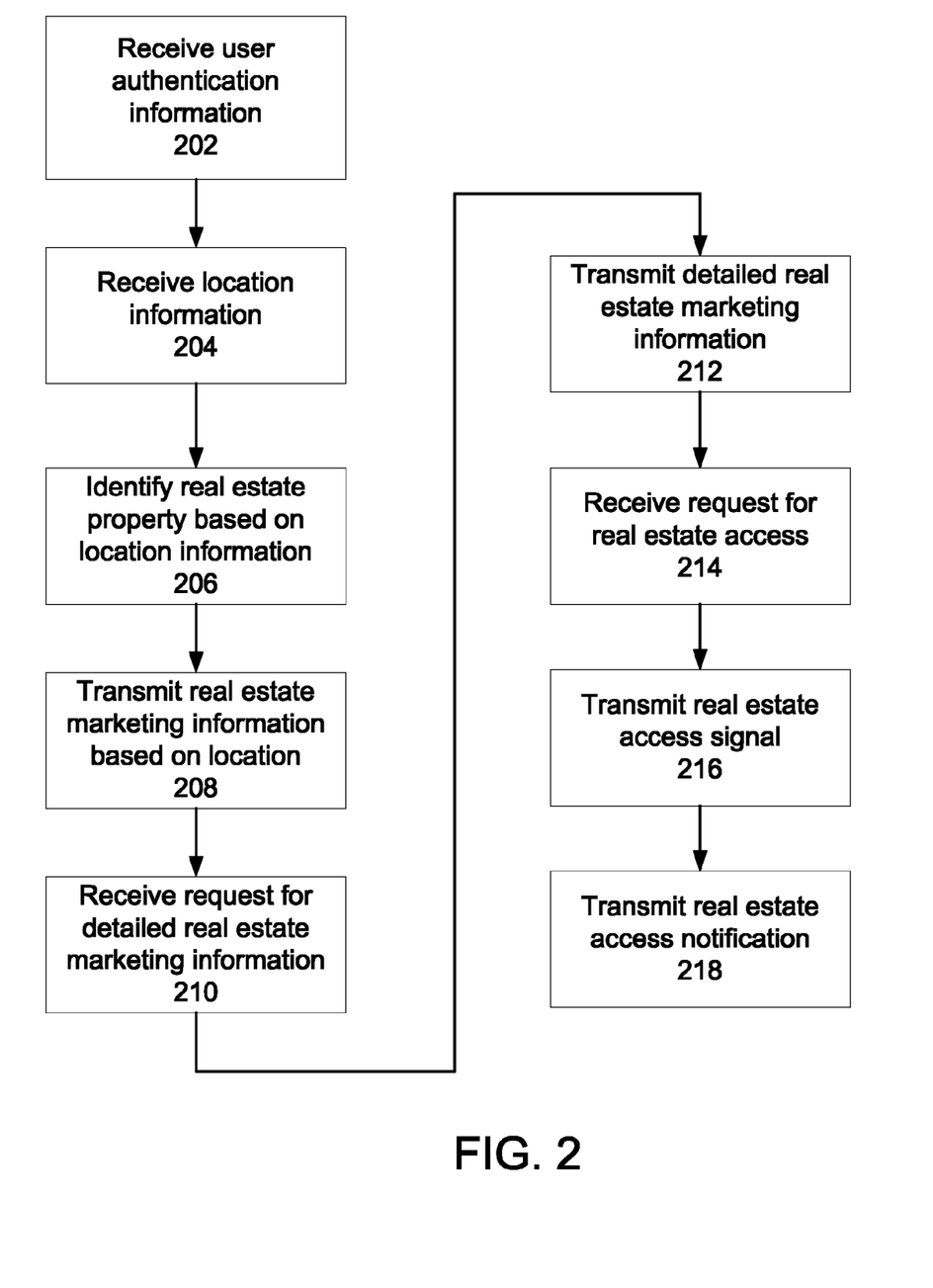
FIG. 2 illustrates an exemplary process for providing physical access to a real estate property or building.

FIG. 2 illustrates an exemplary process for providing physical access to a building. During an initial configuration, independent profile information accessible at a server is associated with each of a user, an owner of the building, and a broker. The profile information for each of the user, owner, and broker may contain authentication data, preferences, additional characteristics, and the like. In one example, the user information can be entered by the user. In another example, the user information is aggregated from one or more third-party sources, such as social networking services. Initially creating a profile on the server may be done, for example, from any web enabled device with access to the server, such as through the Internet, and does not require the user to be a real estate agent or require the user to have a valid real estate license.

At block 202, the server receives user authentication information from the handheld device. The handheld device may be with the associated user as the user is traveling through an area with buildings, such as driving through a neighborhood or a business center. The server may store existing profile information for the user. The profile information may include, for example, a real estate property type (e.g., single family, condo, multifamily, manufactured, and the like), a range for a desired sale, lease, or rental price of real estate, a range for a desired square footage, a range for a desired lot size, a range for a desired number of bedrooms, a range for a desired number of bathrooms, a range for a desired build year, a range for the duration the real estate has been on the market, and the like.

At block 204, the server receives location information of the handheld device. The location information of the handheld device may be received from the handheld device. The location information is based on the location of the handheld device. For example, the location information may be a mailing address, a geographic coordinate, or other information identifying the location of the device. The location information may also include information indicating a direction, speed, destination, expected route to destination, completed route, and the like. The location information may specify the location of the handheld device by including an absolute location parameter or a relative location parameter. Preferably, the absolute location parameter comprises a location using, for example, a coordinate system or a similar system. The relative location parameter comprises a location indicating the proximity of the handheld device to another location or device.

At block 206, the server identifies a real estate property based on the received location information. The real estate property is available for sale, lease, or rent. In one example, the real estate property may be identified based on the proximity of the real estate property to the location of the handheld device. Proximity may be determined by, for example, comparing the absolute locations of the real estate property and the handheld device. In another example, the real estate property is identified based on the proximity of the real estate property to a point on the expected route to destination of the handheld device. In yet another example, the real estate property is identified based on being within a threshold distance of the location indicated by the location information received at block 204 and in the direction, within a certain number of degrees, indicated by the location information received at block 204. Additionally, the real estate property may be selected based on the likelihood that the authenticated user in interested in viewing the real estate for purchase, lease, or rent. The likelihood is determined, for example, using the user's profile information and real estate preferences.

At block 208, the server transmits real estate marketing information to the handheld device. The real estate marketing information is selected based on its association with the identified real estate property that is available for sale, lease, or rent. For example, the real estate marking information includes the mailing address of the identified real estate property, the asking price of the identified real estate property, images and movies of the identified real estate property, and the like. When the user views the real estate marketing information, the user can determine based on the information contained in the real estate marketing information whether the user is interested in the real estate property.

In one embodiment, the server only transmits real estate marketing information to the user when several criteria are met. First, the user is within a threshold distance from the location of the real estate. Second, the real estate meets the real estate preferences of the user as indicated in the user's profile information. Third, the server determines that the user is moving based on location information or a change in location information. In other embodiments, the server requires that some, but not all, of these criteria are met before transmitting real estate marketing information. In yet other embodiments, the server does not require that any of these criteria are met.

At block 210, the server receives a request for detailed real estate information from the handheld device. The handheld device may transmit the request to the server in response to a selection by the user on the handheld device indicating that the user is interested in learning more about the real estate property described in the real estate information. The user may make the selection indicating that the user is interested in learning more about the real estate property after perceiving the real estate information.

At block 212, the server transmits detailed real estate marketing information to the user's handheld device. The detailed real estate marketing information includes, for example, the location, asking price, square footage, lot size, number of bedrooms, number of bathrooms, and the like, of the real estate. In one example, the detailed real estate marking information may also include an advertisement for another property, an advertisement for a broker or real estate agent, or advertisements or information about any number of other services or professionals. In this way, the server may transmit a relatively small amount of information through the marketing information as a notification to the user about a potential property that may interest the user. The user may then request additional detailed information with respect to the properties that interest the user. In response to this request, the server transmits the detailed real estate marketing information to the user's handheld device.

At block 214, the server receives a request for access to the real estate. The request includes the current location of the handheld device. At block 216, the server analyzes the current location information of the handheld device, comparing it to the location of the real estate property or the remote device. Both of these locations may be expressed as absolute locations, rather than relative locations. If the current location of the handheld device is within a threshold distance from the location of the real estate property or remote device, the server transmits a signal granting access to the real estate property. The threshold distance for granting access to the real estate property, also called the access threshold distance, may be different than the threshold distance for transmitting real estate marketing information. The access threshold distance may depend in part on the precision of the location information of the handheld device and/or the precision of the location of the real estate property or remote device.

In some examples, the precision of the location information of the handheld device and/or the precision of location of the real estate property or remote device may be controlled by the server. In some examples, the precision of the location information of the handheld device and/or the precision of location of the real estate property or remote device may be determined by the server, such as by analyzing changes in the location data. Alternatively, the precision of the location information of the handheld device and/or the precision of location of the remote device may be configured locally on the handheld device and on the remote device, respectively.

For example, if the precision of location is accurate to within a first degree of precision, the current location of the handheld device should be within a first access threshold distance before access is granted. If the precision of location is accurate to a second degree of precision (e.g., less precise than the first degree of precision), the current location of the handheld device should be within a second access threshold distance (e.g., a longer distance or larger area) before access is granted. In this way, the system can be more stringent when the location information is more precise, and less stringent when the location information is less precise. Thus, a system that receives location information that is precise to within six inches may require that the user with the handheld device be within three feet of a locked door before allowing access, while a system that receives location information that is precise to within 20 yards may require that the user with the handheld device is within 30 yards of the locked door before allowing access. Alternatively, or in addition, the access threshold distance used for providing access may depend in part on the accuracy, expected error, or expected magnitude of error of the location information of the handheld device and/or the accuracy, expected error, or expected magnitude of error of the location information of the real estate property or remote device.

In one example, this access signal is received by the handheld device and relayed to the remote device. The relay happens, for example, through a Bluetooth connection transmitting the access signal or through an optical imaging device on the remote device that senses a visually rendered access signal on the handheld device. In another example, the access signal is transmitted by the server to the remote device, without the handheld device intervening or relaying the access signal. In either example, when the remote device receives the access signal, the remote device permits access to the building or real estate property.

The remote device may limit the duration during which access to the building or real estate property is permitted. For example, the remote device can keep a door unlocked for a determined access duration. In this way, persons inside the building can still exit the building through the door after the determined access duration has expired. However, the remote device will not permit access to the building through the door by persons outside the building after the access duration has expired. The access duration may be included in the access signal. For example, the server may indicate a longer access duration when the user or handheld device is further from the remote device or building entrance at the time the access request is received. Thus, when a person requesting access is closer to the entrance, the door remains unlocked for a shorter duration than when a person requesting access is further from the entrance. In addition, the access duration may be based on the size (e.g., square feet) or configuration (e.g., layout, number of floors, etc.) of the building or real estate property.

As discussed above, the location information of the handheld device may include an absolute location. Similarly, the location information of the real estate property or the remote device may also include an absolute location. Location information may indicate a specific point, such as a GPS coordinate, or a region. In one example, region-based location information is based on a real-world geographic area such as a neighborhood or city block. In another example, region-based location information is based on virtual boundaries or a radius around a point location.

In one example, information associated with the access request may be transmitted to an agent or owner of the real estate property, who may make a determination on whether access should be granted or denied. Additionally, the access request may be granted or denied in part based on a viewing schedule. As an example of a viewing schedule, the owner or real estate agent associated with the real estate property may specify that access should (or should not) be granted on certain days of the week, on certain holidays, between certain hours of the day, or any other duration. Accordingly, access to the real estate property for viewing does not need to be on a Sunday morning or afternoon, as in a conventional open house.

At block 218, the server transmits a notification indicating that access to the real estate property has been granted. For example, the notification may be transmitted to the owner of the real estate property or the real estate agent associated with the real estate property by email or any other method. This may allow the owner and real estate agent to monitor the frequency and timing of access to the real estate property. The access details may also be stored in a database to enable data mining for frequency of access, timing of various accesses, durations of accesses, and other metrics.

In general, the blocks of FIG. 2 may be performed in various orders, and in some instances may be performed partially or fully in parallel. Additionally, not all blocks must be performed. For example, the system may transmit detailed real estate marketing information without receiving a request for detailed real estate marketing information.

Figure 3:
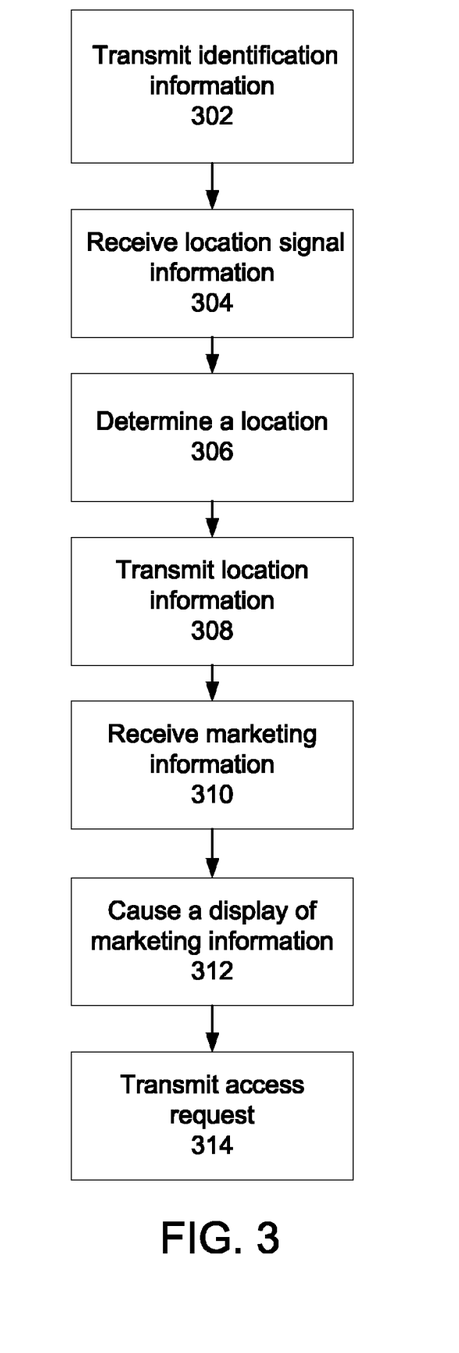
FIG. 3 illustrates another exemplary process for providing physical access to a real estate property or building.

FIG. 3 illustrates another exemplary process for providing physical access to a real estate property. A user is carrying or using a handheld device, such as a cellular smart telephone. The user may be, for example, travelling in a vehicle along a road or the user may be stationary.

At block 302, the handheld device transmits identification information for the handheld device or the user of the handheld device to a server. The identification information is used by the server to authenticate the handheld device or the user. For example, the identification information may comprise a login/password combination, an electronic image of a government-issued identification of the user, an International Mobile Equipment Identity (IMEI), an Electronic Serial Number (ESN), a SIM card identifier, a line of credit account information, an electronic image comprising biometric information, or the like.

At block 304, the handheld device receives location signal information from one or more transmitters. The transmitters may include WiFi base station transmitters, GPS satellite signal transmitters, or the like. The location signal information may be received at one or more signal receiving modules of the handheld device, such as at multiple receivers.

At block 306, the handheld device determines a location for the handheld device. The location may be an absolute location, such as a GPS coordinate (e.g., N37 46.53599 W122 25.158). In another example, the absolute location can be expressed in degrees, minutes, and seconds (e.g., N 37° 46' 32.1594", W 122° 25' 9.48"). The location may be calculated based on measuring the intensity of the received location signal information or comparing timing information contained in the received location signal information. Similarly, a hybrid positioning system can be used where information is gathered from one or more of GPS, cellular towers, WiFi devices, Bluetooth devices, and the like, in order to determine a location for the handheld device.

At block 308, the handheld device transmits location information for the handheld device to a server. The location information is based on the received location signals, and may contain the calculated location of the handheld device. The location information may also include information indicating a direction, speed, destination, expected route to destination, completed route, and the like of the handheld device.

At block 310, the handheld device receives marketing information from the server. The server transmits the marketing information to the handheld device in response to detecting that a condition has been satisfied. The condition may be, for example, that the location information received from the handheld device indicates that the handheld device is located within a threshold distance of a real estate property that is available for sale, lease, or rent. In this example, the marketing information will include information about the real estate property that is determined to be within the threshold distance of the handheld device.

At block 312, the handheld device causes a display to display the received marketing information. The handheld device may additionally display directions to the real estate property associated with the marketing information. The displayed directions to the real estate property can be used by the user of the handheld device to facilitate navigation to the real estate property for which the marketing information is displayed.

At block 314, the handheld device transmits an access request to the server. Typically, this request will be transmitted when the user and handheld device are within an access threshold distance for access of the real estate property. For example, when the handheld device or the user is at the gate of a property or the door of a building. In one embodiment, the handheld device transmits updated location information to the server within a determined time of the access request. The server verifies that the handheld device is within an access threshold distance of the real estate property, or within an access threshold distance of a location at the real estate property, before permitting access.

For example, the determined time difference between the last location information and the access request, referred to as the location-access time, may be one minute. The handheld device can verify when the last location information was transmitted to the server. If the last location information was transmitted to the server longer than one minute ago, the handheld device will transmit updated location information to the server in conjunction with the access request. The updated location information may be transmitted before, after, or simultaneous to transmitting the access request to the server. The server may compare the timing of the latest received location information for the handheld device with the timing of the access request to determine if access to the real estate property should be granted.

In one embodiment, the access request is initiated in response to triggering a geo-fencing feature of the handheld device. Geo-fencing includes, for example, a virtual perimeter around a geographic area. The geographic area may be, for example, the real estate property, the area immediately surrounding the real estate property, or the area within a radius of a point on the real estate property. When the handheld device detects that the handheld device has entered the specified geographic area, the handheld device initiates transmitting an access request to the server. Similarly, the handheld device may prompt the user for permission to initiate transmitting an access request to the server.

A remote device at the real estate property is configured to provide access to the real estate property when an access signal is received from the server or the handheld device. The access signal indicates that the remote device should permit access to the building. The access signal is sent based on confirmation of the location information for the handheld device and confirmation of the identification information for the handheld device or the user of the handheld device.

Similarly, the remote device at the real estate property may be configured to deny access to the real estate property after the server or the remote device determines that the handheld device is not within a determined locking distance. For example, once the system detects that the user has left the property and is more than 200 yards from the property, the remote device receives a lock signal to deny access to the real estate property. The remote device denies access to the real estate property by, for example, locking a deadbolt, until a subsequent access condition is met.

In general, the blocks of FIG. 3 may be performed in various orders, and in some instances may be performed partially or fully in parallel. For example, location signal information may be received prior to transmitting identification information. Additionally, not all blocks must be performed.

Figure 4:
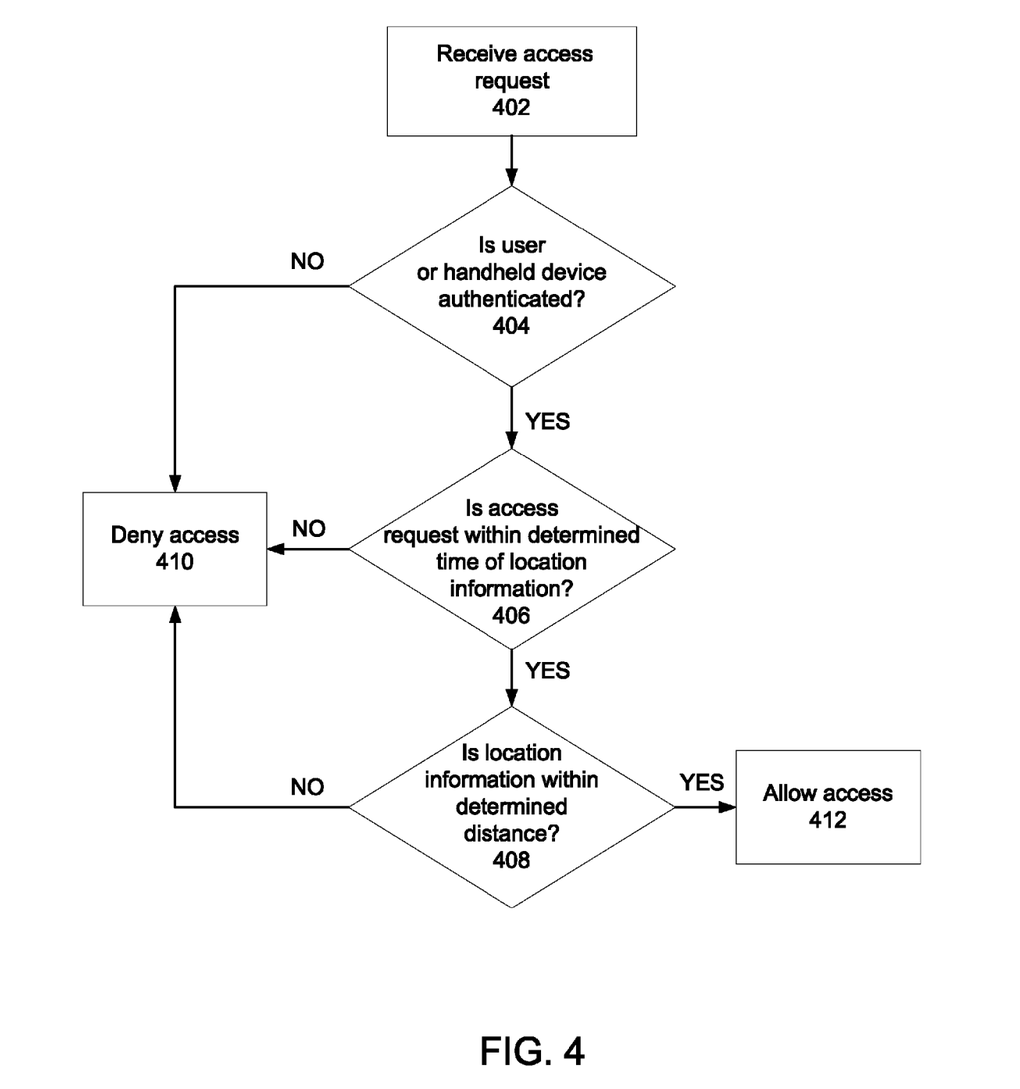
FIG. 4 illustrates an exemplary process for processing a request for access to a real estate property or building.

FIG. 4 illustrates an exemplary process for processing a request for access to a real estate property. At block 402, a server receives an access request for physical access to a real estate property. The access request originates from a handheld device. One of ordinary skill in the art will readily recognize that some blocks in FIG. 4 may be omitted, additional blocks may be added, and that the order of the blocks may be changed without significantly changing the request for access processing.

At block 404, the server determines whether a user or handheld device associated with the access request has been authenticated. Various forms of authentication may be employed to verify the identity of the user or the handheld device.

After determining that the user or handheld device has not been authenticated, the server will deny access to the real estate property at block 410. Alternatively, or in addition, the server may request that the user or handheld device authenticate. The server can deny access by, for example, not issuing an access signal to a remote device located at the real estate property, where the remote device is configured to provide physical access to the real estate property upon receiving the access signal. The server can also deny access by, for example, issuing a denial signal to the remote device. The denial signal indicates that access should not be granted. If, at block 404, the server determines that the user or handheld device is authenticated, the process continues to block 406.

At block 406, the server will determine whether the time difference between the last location information received and the access request is less than (or, alternatively, equal to or less than) a determined time. This time difference is referred to as the location-access time limit. The purpose of this determination is to help confirm that the user or handheld device is at or near the location described in the location information at the time access to the real estate property is requested.

In one example, the location-access time limit is three minutes. When the server receives location information, the server associates the location information with a location information received time stamp. When the server receives an access request at block 402, the server associates the access request with an access request received time stamp. At block 406, the server determines whether the difference between the location information received time stamp and the access request received time stamp is less than the location-access time limit—three minutes in this example. If the difference in time is less than three minutes, the process continues to block 408. If the difference in time is not less than three minutes, the server denies access at block 410 or waits an amount of time equal to or greater than the location-access time limit before denying access at block 410. If the system is configured to wait an amount of time equal to or greater than the location-access time limit, the process continues to block 408 if location information is received after the access request, but within three minutes after the access request is received. Therefore, the process may continue to block 408 regardless of whether the access request is received before or after the location information, as long as the access request and the location information are received within the period defined by the location-access time limit.

At block 408, the server will determine whether the location information is within a determined access threshold distance from the location of the remote device. For example, the distance determination may be based on a straight line distance between the location of the handheld device and the remote device or based on a path distance between the location of the handheld device and the remote device. The path may be, for example, a road, a footpath, a trail, or an expected route around an obstacle. Based on the determination that the location information indicates a location within a determined distanced of the remote device, the system allows access to the real estate property at block 412. If the system determines that the distances between the location indicated by the location information and the location of the remote device is not within the access threshold distance, the system denies access (or does not allow access) at block 410. At block 410, the system may also request an update of the location information of the handheld device. Similarly, the handheld device may transmit updated location information of the handheld device in response to receiving a denial of access based on not being located within the access threshold distance.

In general, the blocks of FIG. 4 may be performed in various orders, and in some instances may be performed partially or fully in parallel. Additionally, not all blocks must be performed.

Figure 5:
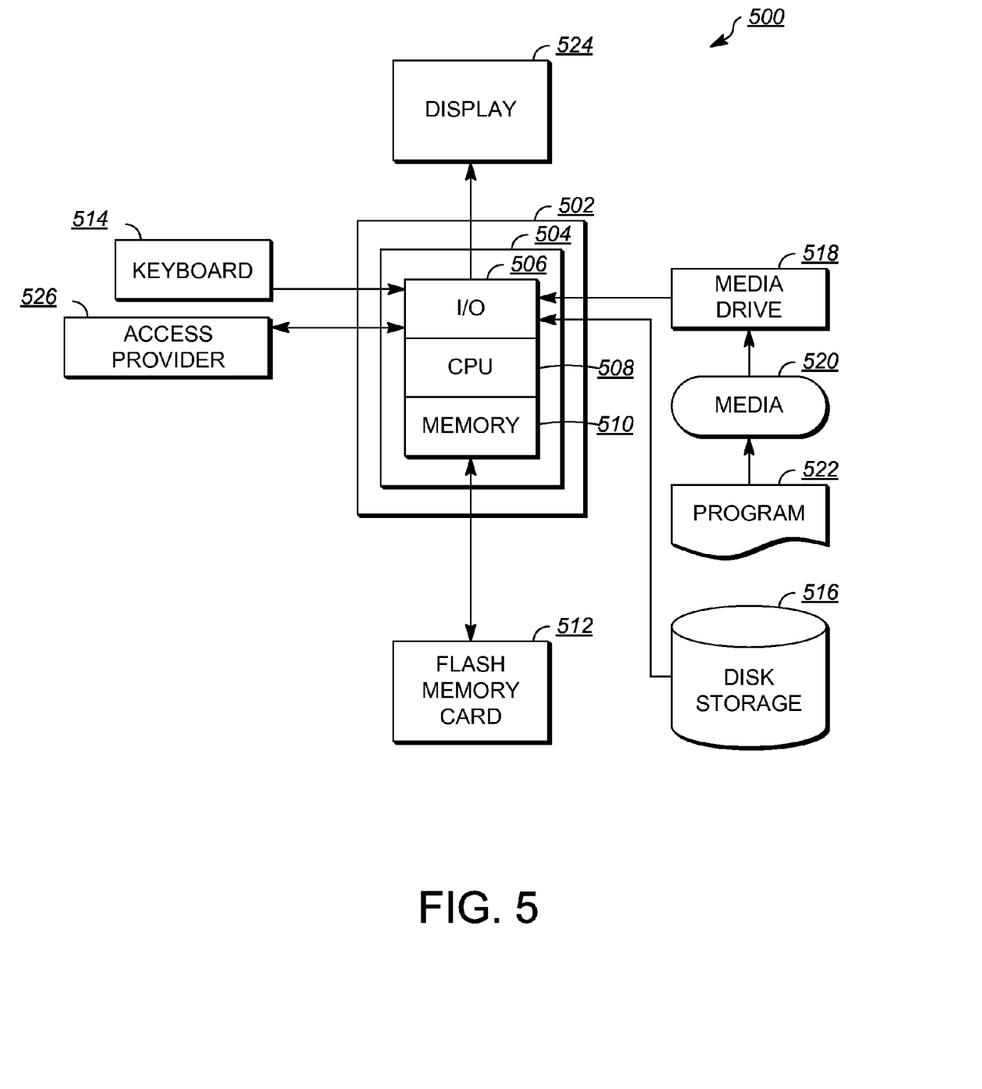
FIG. 5 depicts an exemplary computing system.

FIG. 5 depicts an exemplary computing system 500 configured to perform any one of the above-described processes. In this context, computing system 500 may include, for example, one or more processors, memory, storage, and input/output devices (e.g., monitor, keyboard, disk drive, Internet connection, etc.). However, computing system 500 may include circuitry or other specialized hardware for carrying out some or all aspects of the processes. In some operational settings, computing system 500 may be configured as a system that includes one or more units, each of which is configured to carry out some aspects of the processes either in software, hardware, or some combination thereof.

FIG. 5 depicts computing system 500 with a number of components that may be used to perform the above-described processes. The main system 502 includes a motherboard 504 having an input/output ("I/O") section 506, one or more central processing units ("CPU") 508, and a memory section 510, which may have a flash memory card 512 related to it. The I/O section 506 is connected to a display 524, a keyboard 514, a disk storage unit 516, a media drive unit 518, and an access provider 526. The media drive unit 518 can read/write a computer-readable medium 520, which can contain programs 522 and/or data. The access provider can provide access to real estate properties, such as by notifying a property manager or security provider, throwing a deadbolt to unlock a door or gate, mechanically or magnetically disengaging a lock mechanism, or the like.

At least some values based on the results of the above-described processes can be saved for subsequent use. Additionally, a non-transitory computer-readable medium can be used to store (e.g., tangibly embody) one or more computer programs for performing any one of the above-described processes by means of a computer. The computer program may be written, for example, in a general-purpose programming language (e.g., Pascal, C, C++, Java, and HTML5) or some specialized application-specific language.

Various exemplary embodiments are described herein. Reference is made to these examples in a non-limiting sense. They are provided to illustrate more broadly applicable aspects of the disclosed technology. Various changes may be made and equivalents may be substituted without departing from the true spirit and scope of the various embodiments. In addition, many modifications may be made to adapt a particular situation, material, composition of matter, process, process act(s) or step(s) to the objective(s), spirit or scope of the various embodiments. Further, as will be appreciated by those with skill in the art that each of the individual variations described and illustrated herein has discrete components and features which may be readily separated from or combined with the features of any of the other several embodiments without departing from the scope or spirit of the various embodiments. All such modifications are intended to be within the scope of claims associated with this disclosure.

What is claimed is:

1. A non-transitory computer-readable storage medium comprising computer-executable instructions for coordinating physical access to a real estate property that is for sale, lease, or rent, the computer-executable instructions comprising instructions for:
   receiving a first location information for a handheld device, the first location information based on a first set of location signals;
   receiving identification information for the handheld device or the user of the handheld device;
   transmitting a first marketing information for the real estate property, the real estate property identified based on the first location information;
   receiving a second location information for the handheld device, the second location information based on a second set of location signals;
   receiving a request to provide access to the real estate property;
   transmitting an access signal; and
   wherein a remote device is configured to provide access to the real estate property when the remote device receives the access signal, and wherein the access signal is transmitted based on confirmation of the second location information for the handheld device and confirmation of the identification information for the handheld device or the user of the handheld device.

2. The computer-readable storage medium of claim 1, the computer instructions further comprising instructions for:
   receiving a marketing request, the marketing request indicating interest in the first marketing information; and
   transmitting a second marketing information for the real estate property, the second marketing information including additional characteristics about the real estate property.

3. The computer-readable storage medium of claim 1, wherein the confirmation of the second location information for the handheld device comprises confirmation that the second location information indicates the handheld device is within a threshold distance of the remote device.

4. The computer-readable storage medium of claim 3, wherein the confirmation of the second location information for the handheld device further comprises confirmation that the second location information is received within a determined time of receiving the request to provide access.

5. The computer-readable storage medium of claim 4, wherein the threshold distance is based in part on the precision of the second location information.

6. The computer-readable storage medium of claim 1, the computer instructions further comprising instructions for:
   transmitting the access signal to the remote device.

7. The computer-readable storage medium of claim 1, wherein the first location information comprises a first absolute location and the second location information comprises a second absolute location.

8. The computer-readable storage medium of claim 7, wherein the first absolute location is determined based on a first GPS signal information and the second absolute location is determined based on a second GPS signal information.

9. The computer-readable storage medium of claim 7, wherein a first distance between the first absolute location and the remote device is longer than a second distance between the second absolute location and the remote device, and wherein the second location information is received subsequent to receiving the first location information.

10. The computer-readable storage medium of claim 1, the computer instructions further comprising instructions for:
    transmitting an access notification indicating the building has been accessed.

11. The computer-readable storage medium of claim 1, wherein confirmation of the identification information for the handheld device or the user of the handheld device comprises:
    accessing an identity data selected from the group consisting of biometric data, state issued identification data, and signature identification data.

12. A method for coordinating physical access to a real estate property that is for sale, lease, or rent, the method comprising:
    receiving a first location information for a handheld device, the first location information based on a first set of location signals;
    receiving identification information for the handheld device or the user of the handheld device;
    transmitting a first marketing information for the real estate property, the real estate property identified based on the first location information;
    receiving a second location information for the handheld device, the second location information based on a second set of location signals;
    receiving a request to provide access to the real estate property;
    transmitting an access signal; and
    wherein a remote device is configured to provide access to the real estate property when the remote device receives the access signal, and wherein the access signal is transmitted based on confirmation of the second location information for the handheld device and confirmation of the identification information for the handheld device or the user of the handheld device.

13. The method of claim 12, wherein the confirmation of the second location information for the handheld device comprises confirmation that the second location information indicates the handheld device is within a threshold distance of the remote device.

14. The method of claim 12, wherein the first location information comprises a first absolute location and the second location information comprises a second absolute location.

15. The method of claim 14, wherein the first absolute location is determined based on a first GPS signal information and the second absolute location is determined based on a second GPS signal information.

16. An electronic device, comprising:
    one or more processors; and
    memory storing one or more programs configured to be executed by the one or more processors, the one or more comprising instructions for:
    receiving a first location information for a handheld device, the first location information based on a first set of location signals;

receiving identification information for the handheld device or the user of the handheld device;

transmitting a first marketing information for the real estate property, the real estate property identified based on the first location information;

receiving a second location information for the handheld device, the second location information based on a second set of location signals;

receiving a request to provide access to the real estate property;

transmitting an access signal; and wherein a remote device is configured to provide access to the real estate property when the remote device receives the access signal, and wherein the access signal is transmitted based on confirmation of the second location information for the handheld device and confirmation of the identification information for the handheld device or the user of the handheld device.

17. The electronic device of claim 16, wherein the confirmation of the second location information for the handheld device comprises confirmation that the second location information indicates the handheld device is within a threshold distance of the remote device.

18. The electronic device of claim 16, wherein the first location information comprises a first absolute location and the second location information comprises a second absolute location.

19. The electronic device of claim 18, wherein the first absolute location is determined based on a first GPS signal information and the second absolute location is determined based on a second GPS signal information.

* * * * *